United States Patent [19]

Hasegawa et al.

[11] Patent Number: 4,630,155
[45] Date of Patent: Dec. 16, 1986

[54] MAGNETIC HEAD SHIFTING MEANS FOR FLEXIBLE DISK MEMORY SYSTEM

[75] Inventors: Tadashi Hasegawa; Yoshiharu Kobayashi; Akira Iwamoto; Yoshihisa Tedaka, all of Kanagawa, Japan

[73] Assignee: Mitsubishi Denki Kabushiki Kaisha, Tokyo, Japan

[21] Appl. No.: 525,457

[22] Filed: Aug. 22, 1983

[30] Foreign Application Priority Data

Aug. 23, 1982 [JP] Japan ................. 57-145701

[51] Int. Cl.[4] ................. G11B 5/55; G11B 21/08; G11B 5/54; G11B 21/22
[52] U.S. Cl. ................. 360/106; 360/105
[58] Field of Search ................. 360/99, 104, 109, 106, 360/107, 97, 105

[56] References Cited

U.S. PATENT DOCUMENTS

| 4,144,466 | 3/1979 | Hatch | 360/97 |
| 4,166,284 | 8/1979 | Daniels | 360/106 |
| 4,247,877 | 1/1981 | Keller et al. | 360/104 |
| 4,306,260 | 12/1981 | Maeda et al. | 360/104 |
| 4,349,851 | 9/1982 | Hagashiyama et al. | 360/104 |
| 4,423,449 | 12/1983 | Hasegawa | 360/106 |
| 4,490,635 | 12/1984 | Harrison et al. | 360/106 |

FOREIGN PATENT DOCUMENTS

| 0044151 | 1/1982 | European Pat. Off. . |
| 2948147 | 6/1980 | Fed. Rep. of Germany . |
| 2299696 | of 0000 | France . |
| 2108475 | 5/1972 | France . |
| 57-88570 | 6/1982 | Japan . |
| 57-94961 | 6/1982 | Japan ................. 360/97 |
| 56-33420 | 9/1982 | Japan . |
| 2060979 | 5/1981 | United Kingdom . |
| 2081959 | 2/1982 | United Kingdom . |

OTHER PUBLICATIONS

IBM Technical Disclosure, vol. 17, No. 1, Jun. 1974, Empson et al., "Single Spring ... Voice Coil Motor", p. 219.

Primary Examiner—Robert S. Tupper
Assistant Examiner—Melissa J. Koval
Attorney, Agent, or Firm—Bernard, Rothwell & Brown

[57] ABSTRACT

A magnetic head shifting apparatus for flexible disk memory system wherein kinetic energy of an arm is absorbed by means of a cushioning material interposed between the arm and an abutment of a shackle rod thereby to reduce a transient period of time which is the one until the memory medium and magnetic heads reach their stable state, while damage of the memory medium is suppressed in steady state, whereby stable electromagnetic conversion characteristics can be obtained.

4 Claims, 4 Drawing Figures

MAGNETIC HEAD SHIFTING MEANS FOR FLEXIBLE DISK MEMORY SYSTEM

BACKGROUND OF THE INVENTION

1. Field of the Invention

The present invention relates to a shifting means for magnetic head utilized in a flexible disk (hereinafter referred to simply as "floppy") memory system.

2. Description of the Prior Art

In a floppy memory system which is now widely utilized principally as an external memory means for small electronic computers and the like, it is required to contact a thin magnetic material which has been applied on the surface of a disk-shaped Mylar film comprising a floppy being a storage means with a magnetic head, being an electromagnetic converter, by means of a prescribed pressure applied without damaging either the magnetic material and magnetic head. In conventional shifting means, however, it has been difficult to sufficiently comply with such requirement.

More specifically, such a device as described hereinbelow has heretofore been proposed for a type of magnetic head shifting means as mentioned before. Referring now to FIGS. 1 and 2, as well known, a floppy 1 consists of a thin disk-shaped medium 2 having a magnetic substance on both the surfaces thereof and a jacket 3 containing the disk-shaped medium 2. An opening 4 in which magnetic heads 5a and 5b are to be installed is defined on the jacket 3. These magnetic heads 5a and 5b are supported by means of springs 6a and 6b and pressed by the memory medium 2, respectively. One end of an arm 8 is subjected to insert molding by means of injection molding and the like to hold a leaf spring 7 therein, and a surface of the arm 8 is the one for fixing the spring 6a holding the magnetic head 5a. A carriage 20 is guided by means of a guide bar 21 and is movable in radial direction of the memory medium 2 along the guide bar 21. A pedestal 10 for fixing the leaf spring 7 of the arm 8 to the carriage 20 is formed on a side end of the carriage 20. A transverse arm 13 for separating the magnetic head 5a from the memory medium 2 extends from the opposite side end of the arm 8. Furthermore, a coiled spring 15 is interposed between a spring-loaded member 16 and the arm 8 to transfer the latter in a vertical direction with respect to the plane of the memory medium 2, whereby contact of the magnetic heads 5a and 5b with the memory medium 2 is effected with an appropriate pressure. The leaf spring 7 is secured to the pedestal 10 of the carriage 20 by means of the spring-loaded member 16 together with a set-screw 17.

Next, operation of such conventional magnetic head shifting means will be described hereinbelow.

First of all, the transverse arm 13 is lifted to transfer the arm 8 in reverse A direction (FIG. 2) with an amount equal to or more than that of deformation of the springs 6a and 6b in addition to a thickness (=h) of the jacket 3. As the result, a gap equal to or more than the thickness of the jacket 3 can be obtained between the opposed magnetic heads 5a and 5b. Then, the jacket 3 is inserted into the gap between these magnetic heads 5a and 5b to locate the same, and thereafter the medium 2 is rotated around the center thereof.

Then, when the transverse arm 13 is returned along direction A, the magnetic heads 5a and 5b contact with the magnetic material 11 on the medium 2. In such condition as mentioned above, when an electrical signal is given to the magnetic head 5a, magnetic field is generated to magnetize the magnetic material 11 on the medium 2. It is well known that a prescribed information is recorded on the medium 2 in accordance with the manner as described above, whilst such information is read by converting a change in magnetic flux into an electrical signal.

Meanwhile, in such conventional magnetic head shifting means as mentioned above, contact pressure of the magnetic heads 5a and 5b with the magnetic material 11 is derived from reaction force of the compressed coiled spring 15 and kinetic energy of the arm 8 involving the magnetic head 5a effecting rotary motion around the pedestal 10 as the center in direction A. Accordingly, concerning the contact of the magnetic heads 5a and 5b with the magnetic material 11, the kinetic energy and compressive force of the coiled spring 15 become problems in its transient state and its steady state, respectively. In other words, such kinetic energy cannot be reduced, if a special control is not effected for acceleration in the case when the transverse arm 13 is transferred in direction A. In addition, it is self-evident that the state of contacting of the magnetic heads 5a and 5b with the magnetic material 11 in both the transient state and the steady state is different in the case where direction A coincides with gravitational direction, and the case where the reverse A direction coincides with gravitation direction in respect of mass of the arm 8 involving the magnetic head 5a. More specifically, in conventional magnetic head shifting means, compressive force of the coiled spring 15 and acceleration control of the transverse arm 13 must be suitably selected or adjusted every time in accordance with posture and direction in installation of such conventional magnetic head shifting means with respect to gravitational direction.

The disadvantages of a magnetic head shifting means in conventional floppy memory systems have been described hereinbefore.

SUMMARY OF THE INVENTION

It is an object of the present invention to provide a magnetic head shifting means utilized in a flexible disk memory system by which the disadvantages of the aforesaid conventional means can be eliminated, and the transient period of time which is the period until the magnetic heads contact stably with the memory medium can be reduced, and in steady state, damage of such memory medium can be suppressed to obtain stable electromagnetic conversion characteristics.

Further objects and advantages of the present invention will become apparent from the following detailed description of the preferred embodiments by referring to the accompanying drawings.

DESCRIPTION OF THE PREFERRED EMBODIMENT

Figure 1:
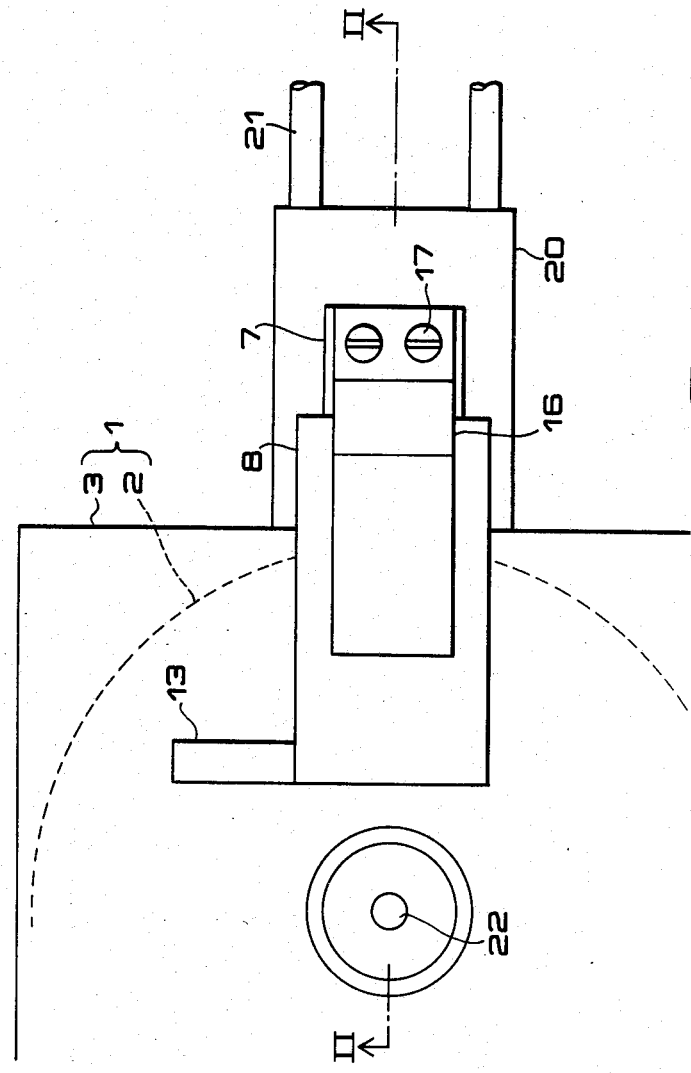
FIG. 1 is a planar view showing a conventional magnetic head shifting means.
Figure 2:
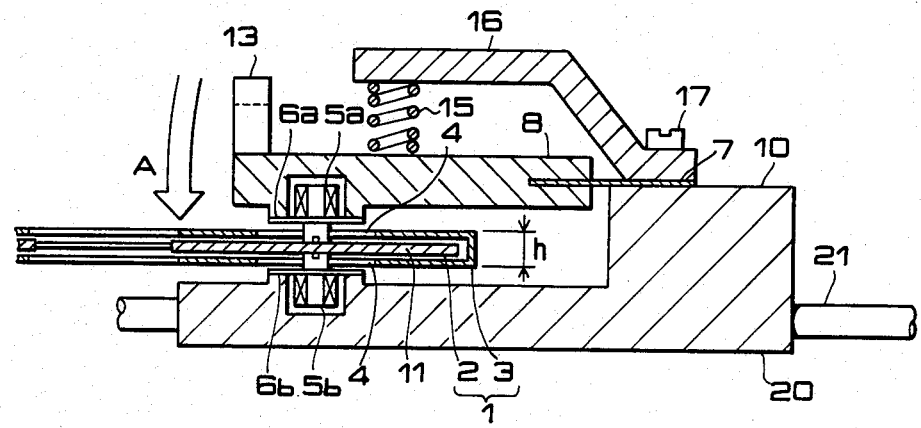
FIG. 2 is a sectional view taken along line II—II of FIG. 1.
Figure 3:
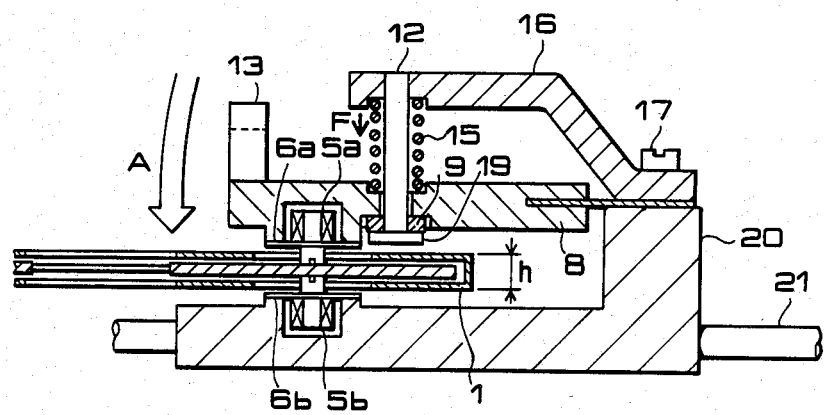
FIG. 3 is a sectional view showing a magnetic head shifting means according to the present invention.

FIG. 3 is a sectional view illustrating an embodiment of the magnetic head shifting means in accordance with the present invention wherein the same reference numerals in FIGS. 1 and 2 designate corresponding or like parts in FIG. 3. In FIG. 3, reference character 12 designates a shackle rod for shackling transfer of an arm 8 as mentioned hereinbelow. The upper end of the shackle rod 12 is secured to the spring-loaded member 16 by means of adhesive bonding, forcing, screwing or the like, whilst the lower part of the shackle rod 12 passes through the arm 8 and the extreme end of the rod is provided with an abutment 19. Furthermore, a cushioning material 9 shaped from a shock-absorbing material such as sponge, rubber or the like is placed between the lower end portion 19 of the shackle rod 12 and the arm 8. A coiled spring 15 is interposed between the spring-loaded member 16 to which the shackle rod 12 is secured and the arm 8. Contacting action of magnetic heads 5a and 5b with a medium 2 in the present embodiment of the magnetic head shifting means will be described in detail hereinbelow.

First of all, the transverse arm 13 is moved in reverse A direction to provide a transfer amount equal to that of deformation of springs 6a and 6b in addition to a thickness h of a jacket 3 so that a gap equal to or more than the thickness of the jacket 3 can be obtained between the opposed magnetic heads 5a and 5b. Thereafter, the transverse arm 13 is returned along direction A as in a conventional magnetic head shifting means. On the occasion of such return, the transfer amount of the arm 8 in direction A is restricted by means of the abutment 19 of the shackle rod 12. And all the kinetic energy of the arm 8 and the magnetic head 5a is never converted into energy of collision between the magnetic heads 5a, 5b and the medium 2, because of shock-absorbing effect of the cushioning material 9 sandwiched between the shackle rod 19 and the arm 8. Accordingly, the medium 2 is not damaged so that the life thereof can be prolonged.

Meantime, contact pressure of the magnetic heads 5a and 5b with the medium 2 must be controlled within a value of about 18-22 g under such condition that wear of the medium 2 is minimized in case of steady state. In accordance with the magnetic head shifting means of the present invention, contact pressure of the magnetic heads 5a and 5b with the medium 2 can be set with an appropriate pressure loading by means of only the springs 6a and 6b. In other words, since the magnetic head shifting means is not affected by mass of the arm 8 and the magnetic head 5a, the shifting means may be installed in any direction with respect to gravitational direction.

Figure 4:
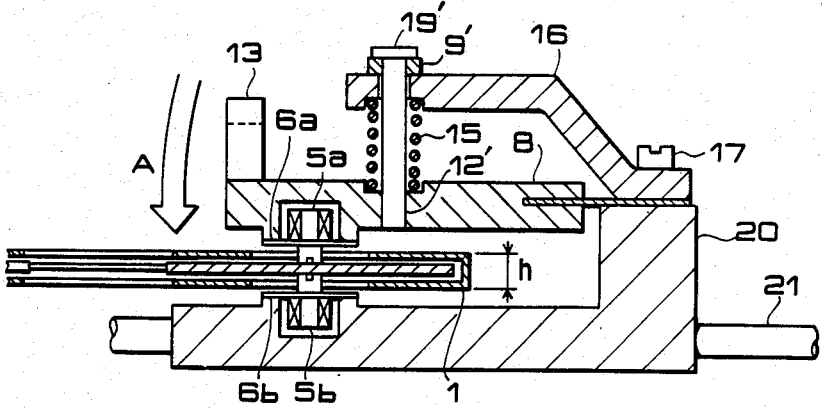
FIG. 4 is a sectional view showing another embodiment of the magnetic head shifting means according to the present invention.

FIG. 4 illustrates another embodiment of the magnetic head shifting means according to the present invention wherein the lower end of a shackle rod 12' is fixed to an arm 8 by means of screwing, adhesive bonding, forcing or the like, whilst the top of the shackle rod 12' is provided with an abutment 19'. A cushioning material 9' is interposed between the abutment 19' and a spring-loaded member 16.

It is, of course, apparent that restriction for transfer amount of the arm 8 along direction A as well as shock-absorbing effect of kinetic energy of the arm 8 are similar to those in the above first embodiment.

According to the present invention, as described hereinabove, transfer amount of the arm itself can be restricted by means of the abutment of the shackle rod, besides kinetic energy can be absorbed by means of the shock-absorbing material sandwiched between the arm and the abutment. Accordingly, the magnetic head shifting means of the invention can reduce a transient period of time which is the one until the magnetic heads contact stably with the memory medium, while the shifting means can suppress damage of the medium in steady state, whereby stable electromagnetic conversion characteristics can be obtained.

What is claimed is:

1. A magnetic head shifting means for memory system including a flexible disk, said means comprising:
   (a) a carriage movable in a radial direction of said flexible disk and supporting either of a pair of magnetic heads, said magnetic heads facing each other with said flexible disk therebetween;
   (b) an arm, one end of which is joined to said carriage and another end of which carries the other of said magnetic heads;
   (c) a coiled spring for applying a prescribed pressure to said arm;
   (d) a spring-loaded member for holding said coiled spring; and
   (e) a shackling means extending from said spring-loaded member to said arm for restricting movement of said arm due to pressing of said coiled spring, said shackling means including a shackle rod the upper end of which is secured to said spring-loaded member, and the lower end of which is provided with an abutment portion and a cushioning material contacting with said arm in the recording/reproducing position, whereby a damping effect is provided in the direction that said head comes into contact with said flexible disk so that movable parts may be directly damped.

2. A magnetic head shifting means as claimed in claim 1, wherein said cushioning material is interposed between the abutment portion of said shackle rod and said arm.

3. A magnetic head shifting means for a memory system including a flexible disk, said means comprising:
   (a) a carriage movable in a radial direction of said flexible disk and supporting either of a pair of magnetic heads, said magnetic heads facing each other with said flexible disk therebetween;
   (b) an arm, one end of which is joined to said carriage and another end of which carries the other of said magnetic heads;
   (c) a coiled spring for applying a prescribed pressure to said arm;
   (d) a spring-loaded member for holding said coiled spring; and
   (e) a shackling means disposed between said spring-loaded member and said arm for restricting movement of said arm due to pressing of said coiled spring, said shackling means including a shackle rod the lower end of which is secured to said arm, and the upper end of which is provided with an abutment portion and a cushioning material contacting with said arm in the recording/reproducing position, whereby a damping effect is provided in the direction that said head comes into contact with said flexible disk so that movable parts may be directly damped.

4. A magnetic head shifting means as claimed in claim 3, wherein said cushioning material is interposed between said abutment portion of shackle rod and said spring loaded-member.

* * * * *